US006377431B1

(12) United States Patent
Jones et al.

(10) Patent No.: US 6,377,431 B1
(45) Date of Patent: Apr. 23, 2002

(54) NON-AUTOMATIC POWER CIRCUIT BREAKER INCLUDING TRIP MECHANISM WHICH IS DISABLED AFTER CLOSURE OF SEPARABLE CONTACTS

(75) Inventors: William J. Jones, Cranberry Township; Richard A. Johnson, Hopewell Township, both of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/374,448

(22) Filed: Aug. 13, 1999

(51) Int. Cl.$^7$ .................................................. H02H 3/00
(52) U.S. Cl. ....................................................... 361/96
(58) Field of Search ................................. 200/400, 573; 361/93.1–96, 71–75, 88, 89, 102, 109, 115

(56) References Cited

U.S. PATENT DOCUMENTS

| 4,000,478 A | * | 12/1976 | Jencks et al. | 335/34 |
| 4,297,741 A | * | 10/1981 | Howell | 361/93 |
| 4,914,385 A | * | 4/1990 | Arinobu | 324/127 |
| 4,984,124 A | * | 1/1991 | Yeh | 361/59 |
| 5,276,416 A | | 1/1994 | Ozaki | 335/18 |
| 5,369,542 A | | 11/1994 | Leone et al. | 361/94 |
| 5,627,717 A | * | 5/1997 | Pein et al. | 361/95 |
| 5,650,907 A | | 7/1997 | Ishii et al. | 361/93 |
| 5,825,602 A | * | 10/1998 | Tosaka et al. | 361/94 |
| 6,175,479 B1 | * | 1/2001 | Boyd et al. | 361/96 |

* cited by examiner

Primary Examiner—Josie Ballato
(74) Attorney, Agent, or Firm—Martin J. Moran

(57) ABSTRACT

A non-automatic power circuit breaker includes separable contacts for movement between a closed position and an open position, and an operating mechanism for moving the separable contacts between the open and closed positions. A time-delayed making current release switch is closed for the open position of the separable contacts and is opened a predetermined time after the separable contacts move to the closed position. A low permeability air core current transformer senses an electrical current flowing in a current conductor for the separable contacts and provides a signal corresponding to the electrical current. An analog trip unit employs the signal corresponding to the electrical current and the making current release switch signal corresponding to the open and closed positions of the separable contacts and provides a trip signal. The analog trip unit includes a comparator for disabling the trip signal when the making current release switch is opened. A low energy trip actuator employs the trip signal for actuating the operating mechanism to move the separable contacts to the open position thereof. A circuit including rectifiers, a voltage regulator and a capacitor powers the low energy trip actuator from the signal of the current transformer.

1 Claim, 4 Drawing Sheets

NON-AUTOMATIC POWER CIRCUIT BREAKER INCLUDING TRIP MECHANISM WHICH IS DISABLED AFTER CLOSURE OF SEPARABLE CONTACTS

CROSS REFERENCE TO RELATED APPLICATION

This Application is related to commonly assigned, copending application Ser. No. 09/005,816, filed Jan. 12, 1998, now U.S. Pat. No. 5,943,204, entitled "Electronic Trip Unit With Dedicated Override Current Sensor" by Jones et al.

BACKGROUND OF THE INVENTION

1. Field of the Invention

This invention is directed to circuit breakers and, more particularly, to non-automatic power circuit breakers which employ a trip mechanism.

2. Background Information

The most important application feature that distinguishes a power circuit breaker from a molded case circuit breaker is the ability of the power circuit breaker to tolerate very high overcurrent levels without tripping. The maximum current level that a power circuit breaker can tolerate for a short time period without internal damage is called its short time withstand current rating (e.g., generally, short time withstand current ratings of 0.5, 1.0 and 3.0 seconds are established). The short time withstand current rating identifies the mechanical and thermal ability of the power circuit breaker to withstand overcurrents for the given period of time and is specified as a characteristic of the breaker independent of the current levels at which the trip functions are actuated.

Power circuit breakers are typically used in radial distribution systems to feed a load center, motor control center or panel boards. A multiplicity of circuit breakers in these load centers then feed a variety of individual loads. To coordinate the tripping characteristics of the power circuit breaker with these downstream breakers, it is very desirable to design the mechanical characteristics of the breaker so that its "withstand current" level is as high as possible, preferably equal to the available fault current from the source of supply.

If power circuit breakers are applied within the limits of their short time withstand current rating, they are generally applied without an instantaneous trip feature. These power circuit breakers can tolerate any available fault current for that short time and give the downstream circuit breakers an ample opportunity to clear any fault that may develop on one of the load lines. Only if the fault is located immediately downstream, with no intervening circuit breaker, should the power circuit breaker ultimately trip open. For any other fault location, the power circuit breaker should stay closed. Thus, continuity of service is preserved for all of the feeder loads that are not directly involved with the fault. This feature, where only the circuit breaker immediately upstream from any fault opens, is called "selective coordination" or "selectivity."

Modern low voltage power circuit breakers are frequently designed with sufficient energy in the closing springs to close on a modest overcurrent condition, but with insufficient energy to close on a relatively large fault current condition. Such circuit breakers are designed to "withstand" such fault currents once closed, but need not be able to "close and latch" on them.

This inability to "close and latch" results from a conscious design compromise between the closing spring energy of the operating mechanism and the resulting operating endurance and reliability. If such a circuit breaker attempts to close on a relatively large fault current, then closure will normally be incomplete and damage may result to the separable contacts if this condition is permitted to persist. Integral trip units installed in such circuit breakers can detect such a fault current condition upon closure and issue an immediate trip signal if the fault current exceeds a "close and latch" threshold for the particular circuit breaker. This important self-protection feature is commonly termed "making current release" (MCR) and is employed by many modern low voltage power circuit breakers.

Typically, the major cost elements of an integral trip unit are the current sensors (e.g., one current sensor per phase) which sense the phase currents that flow through the circuit breaker, and the circuitry that processes the sensed current signals to determine when and if the circuit breaker should be tripped to open the separable contacts. The cost of these elements is typically several hundred dollars. However, once these elements are present, the MCR functionality is gained at minimal incremental cost.

There is a segment of the power circuit breaker market that applies power circuit breakers as simple switches requiring no automatic overcurrent protection and, thus, no overcurrent trip unit. Alternatively, such switches, which are termed non-automatic circuit breakers, may be sold to users that prefer to provide their own overcurrent protection system.

In this instance, the manufacturer assigns to the non-automatic circuit breaker a short circuit current rating which is equal to the withstand capability. However, since there is no trip unit, the MCR function cannot be provided and the inability of the circuit breaker to close completely onto a fault current that is otherwise within its short circuit rating makes it vulnerable to misuse. It, therefore, becomes desirable to satisfy the MCR function by an alternate, albeit less expensive, approach. Accordingly, there is room for improvement.

SUMMARY OF THE INVENTION

This need and others are satisfied by the invention, which is directed to a non-automatic power circuit breaker which provides the protection of a making current release (MCR) function therein, but without the expense of a complex multi-function trip unit.

The non-automatic power circuit breaker comprises separable contact means for movement between a closed position and an open position, and operating means for moving the separable contact means between the open and closed positions. A means determines a signal having a first state for the open position of the separable contact means and a second state after the separable contact means moves to the closed position. A sensing means senses an electrical current which passes through the separable contact means and provides a signal corresponding to the electrical current. A tripping means employs the signal corresponding to the electrical current and the signal corresponding to the open and closed positions of the separable contact means for providing a trip signal. The tripping means includes means for disabling the trip signal when the signal of the means for determining has the second state. A trip actuator means employs the trip signal for actuating the operating means to move the separable contact means to the open position thereof. A means powers the trip actuator means from the signal of the sensing means.

Preferably, the sensing means includes a current sensor having an output, and the means for powering the trip actuator means includes a capacitor, and means for charging the capacitor from the output of the current sensor, with the capacitor powering the trip actuator means.

The means for determining preferably includes means cooperating with the operating means for determining the open and closed positions of the separable contact means, and switch means driven by the means cooperating with the operating means for determining the signal having the first and second states. As a further refinement, the switch means includes a switch having a first position corresponding to the first state and a second position corresponding to the second state, and the means cooperating with the operating means includes means for delaying movement of the switch from the first position to the second position thereof a predetermined time after the separable contact means moves to the closed position thereof.

As another aspect of the invention, a non-automatic power circuit breaker comprises separable contact means for movement between a closed position and an open position, and operating means for moving the separable contact means between the open and closed positions. A means determines a signal having a first state for the open position of the separable contact means, and having a second state a predetermined time after the separable contact means moves to the closed position thereof. A sensing means senses the electrical current of the separable contact means and includes a coil having an air core or a low permeability core for providing a signal corresponding to the electrical current. An analog tripping means employs the signal corresponding to the electrical current and the signal corresponding to the open and closed positions of the separable contact means for providing a trip signal. The analog tripping means includes means for disabling the trip signal after the separable contact means moves to the closed position thereof when the signal of the means for determining has the second state. A trip actuator means employs the trip signal for actuating the operating means to move the separable contact means to the open position thereof.

As a further aspect of the invention, a non-automatic power circuit breaker comprises separable contact means for movement between a closed position and an open position, and operating means for moving the separable contact means between the open and closed positions thereof. A means cooperates with the operating means for providing a signal having a first state for the open position of the separable contact means, and having a second state a predetermined time after the separable contact means moves to the closed position thereof. A current sensor includes a coil having an air core or a low permeability core. The current sensor senses electrical current flowing in the separable contact means and provides a signal corresponding to the electrical current. A low energy trip actuator employs a trip signal for actuating the operating means to move the separable contact means to the open position thereof. An analog trip means comprises a capacitor charged by the signal of the current sensor, means employing the signal of the current sensor for providing the trip signal, means disabling the trip signal when the signal of the means cooperating with the operating means has the second state, and means employing the capacitor for powering the trip actuator means.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
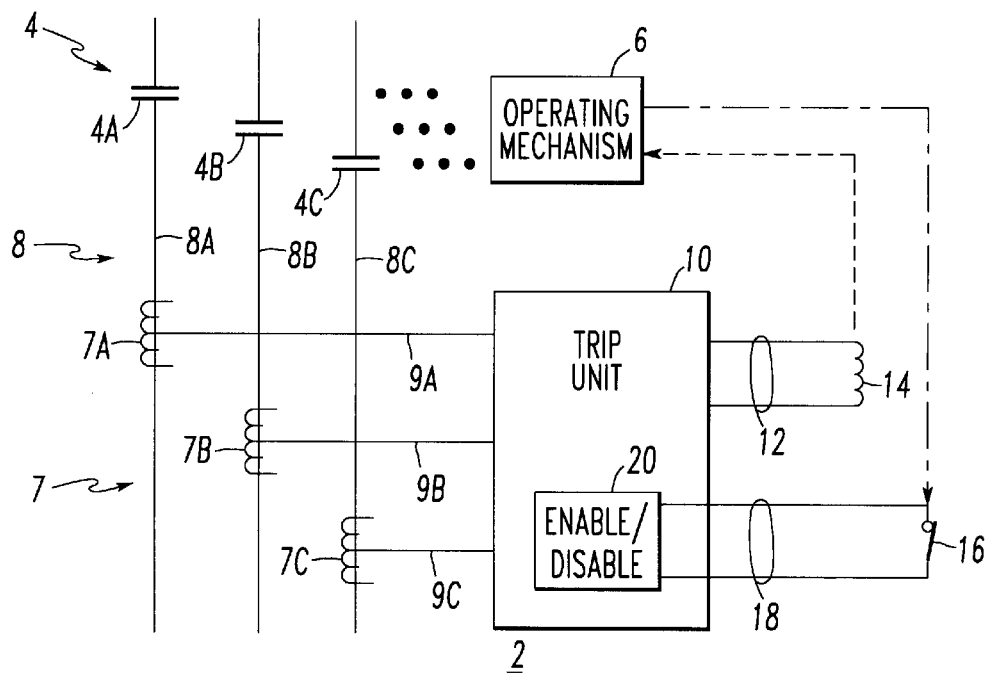
FIG. 1 is a simplified block diagram of a non-automatic low voltage power circuit breaker employing a making current release (MCR) switch in accordance with the invention.

Referring to FIG. 1, a simplified block diagram of a non-automatic low voltage power circuit breaker 2 employing a making current release (MCR) function is illustrated. The circuit breaker 2 includes separable contacts 4, such as three-phase separable contacts 4A,4B,4C, for movement between a closed position (not shown) and an open position. Although a three-phase power distribution system for a low voltage circuit breaker is shown, the invention is applicable to a wide variety of non-automatic power circuit breakers employing any number of phases which may include neutral and/or ground conductors.

An operating mechanism 6 moves the separable contacts 4 between the open and closed positions thereof. The operating mechanism 6 may employ a suitable closing circuit (not shown) (e.g., an operating handle, close actuator mechanism, close coil) to move the separable contacts 4 to the closed position.

A sensing mechanism 7, such as the exemplary current sensors or current transformers 7A,7B,7C, senses the three phase currents flowing in the phase conductors 8A,8B,8C between a power source (not shown) and a load (not shown), and outputs sensed current signals 9A,9B,9C, respectively, corresponding to the three current conditions.

A tripping circuit or trip unit 10 of the circuit breaker 2 employs the sensed current signals 9A,9B,9C and produces a trip signal 12. In turn, a trip actuator mechanism, such as a low energy trip actuator 14, employs the trip signal 12 to actuate the operating mechanism 6 and move the separable contacts 4 to the open position.

A conventional MCR switch 16 is closed for the open position of the separable contacts 4 and is opened after the separable contacts 4 move to the closed position thereof. In this manner, the MCR switch 16 provides a signal 18 having a first state for the open position of the separable contacts 4 and having a second state after the separable contacts 4 are closed. In turn, the trip unit 10 employs the sensed current signals 9A,9B,9C and the signal 18 corresponding to the open and closed positions of the separable contacts 4 for providing the trip signal 12. The trip unit 10 includes a circuit 20 which disables the trip signal 12 when the MCR switch 16 is opened and the signal 18 has the second state.

Figure 5A:
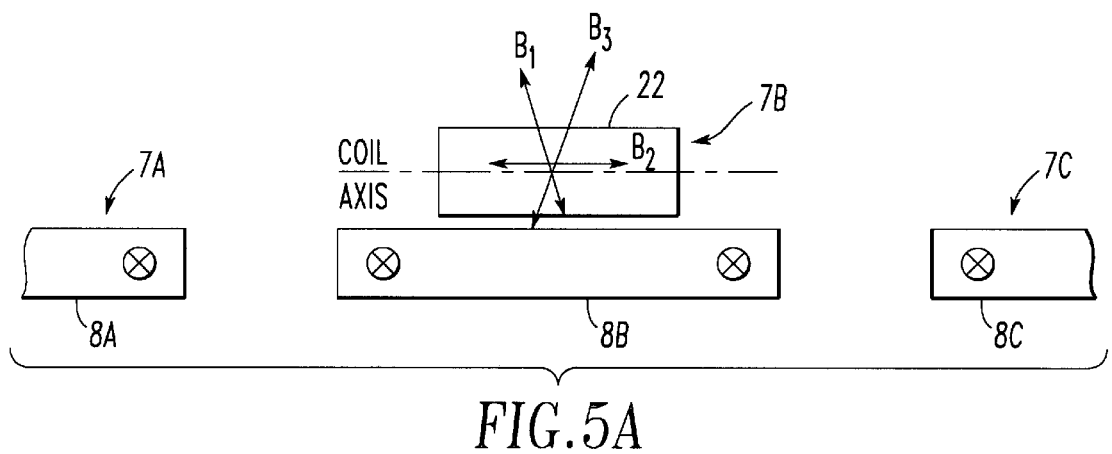
FIG. 5A is an end view and FIG. 5B is a perspective view of the placement of the current sensor in relation to the three-phase conductors of FIG. 1 that are monitored by this invention.
Figure 5B:
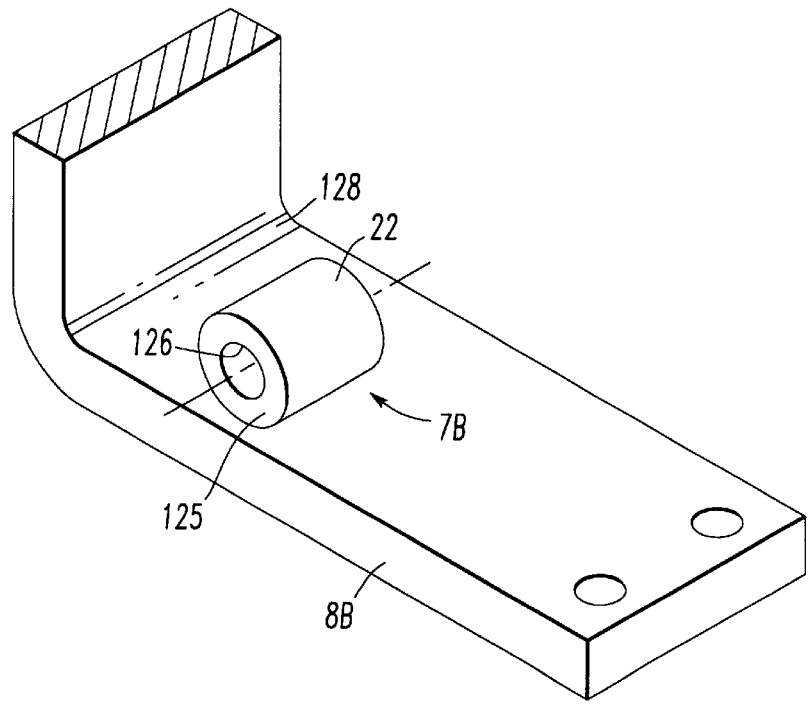

Preferably, three air core bobbin-wound electrical coils, such as coil 22 of FIG. 5B, are employed by the current sensing mechanism 7. These coils 22 are inexpensive and provide suitable accuracy and sufficient output power at modest overcurrent conditions to charge a capacitor 24 (shown in FIGS. 2 and 3) which can subsequently energize the low energy trip actuator 14. Also, the non-automatic circuit breaker 2 preferably also employs an analog trip circuit, such as circuit 44 of FIG. 3, which receives the current signals 9A,9B,9C and the MCR switch signal 18 and outputs the trip signal 12, when appropriate, to the low energy trip actuator 14.

As discussed below in connection with FIGS. 5A and 5B, the exemplary coils 22 are preferably positioned adjacent to each of the phase conductors 8A,8B,8C in order to minimize phase interaction. The output current signal, such as signals 9A,9B,9C, from each of the coils 22 is a voltage which is proportional to both the magnitude and frequency of the current in the corresponding phase conductor. If the frequency is a known constant, then the coils 22 provide predictable outputs that, in general, are dependent only upon the phase currents.

The exemplary low energy trip actuator 14 is employed for the tripping function of the circuit breaker 2. Preferably, this actuator 14 is inexpensive and uses stored mechanical energy in a compressed spring which is released by an electrically operated magnetic latch. In this manner, a small amount of electrical energy can be used to release a much larger amount of mechanical energy in order to trip the breaker 2.

The exemplary MCR switch 16 provides a "closing delay" function and changes state when the circuit breaker 2 opens and closes. This switch 16 is employed by the trip unit 10 to recognize a fault current which appears immediately after closure of the separable contacts 4, and to ignore any current or fault current which appears a predetermined time after the circuit breaker 2 has been closed. As discussed below in connection with FIG. 4, the MCR switch 16 is preferably inexpensive and employs a micro-switch 26 and an inertial wheel 28 to provide a suitably small time delay when the circuit breaker 2 closes. In this manner, the MCR switch 16 is active (i.e., closed) when the circuit breaker 2 is closing (or making), but is deactivated (i.e., opened) a suitable predetermined time (e.g., a fraction of a second) after closure. Thus, the exemplary trip unit 10 effectively operates (e.g., for about a fraction of a second) during the time after the separable contacts 4 are closed and before the time that the MCR switch 16 is opened.

Figure 2:
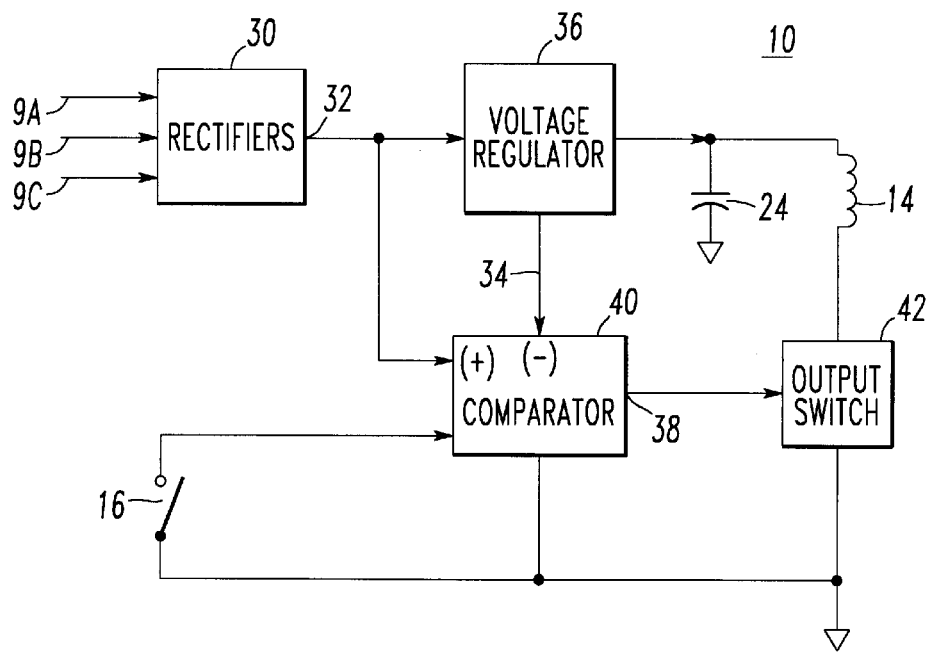
FIG. 2 is a schematic diagram, primarily in block form, illustrating the trip unit and associated interfaces of FIG. 1.

FIG. 2 is a block diagram of the exemplary trip unit 10. The alternating current (AC) sensed current signals 9A,9B, 9C from the coils 22 (FIG. 5) of the current sensing mechanism 7 are rectified by rectifiers 30. The output 32 of the rectifiers 30 and, thus, the sensed current signals 9A,9B, 9C are employed, through voltage regulator 36, to charge the capacitor 24 to a suitable working voltage (e.g., about 40 VDC in the exemplary embodiment). At the threshold tripping current (e.g., 15 times the frame rating in the exemplary embodiment), the charging time of the capacitor 24 is typically less than 20 ms. As discussed below, the resulting voltage across the capacitor 24 is employed to power the trip actuator 14.

Under these conditions, and when the MCR switch 16 is closed (as shown in FIG. 1), the maximum voltage of the current sensors 7A,7B,7C (FIG. 1) is compared to a reference signal, such as reference voltage 34 which is set by voltage regulator 36. If any of the three phase currents exceeds the predetermined threshold level as set by the reference voltage 34, then the output 38 of the comparator 40 is employed to energize output switch 42 which discharges the voltage of the capacitor 24 through the trip actuator 14 and, thus, trips the circuit breaker 2 of FIG. 1.

If no sufficiently high fault current exceeding the "close and latch" threshold is present immediately after closing the circuit breaker 2, then it will close completely. Then, after the "closing delay", the MCR switch 16 is opened (as shown in FIG. 2) to disable the comparator 40 and, thus, the trip unit 10, in order that the circuit breaker 2, when closed, will not trip on a subsequent fault event even if it does exceed the "close and latch" threshold.

Figure 3:
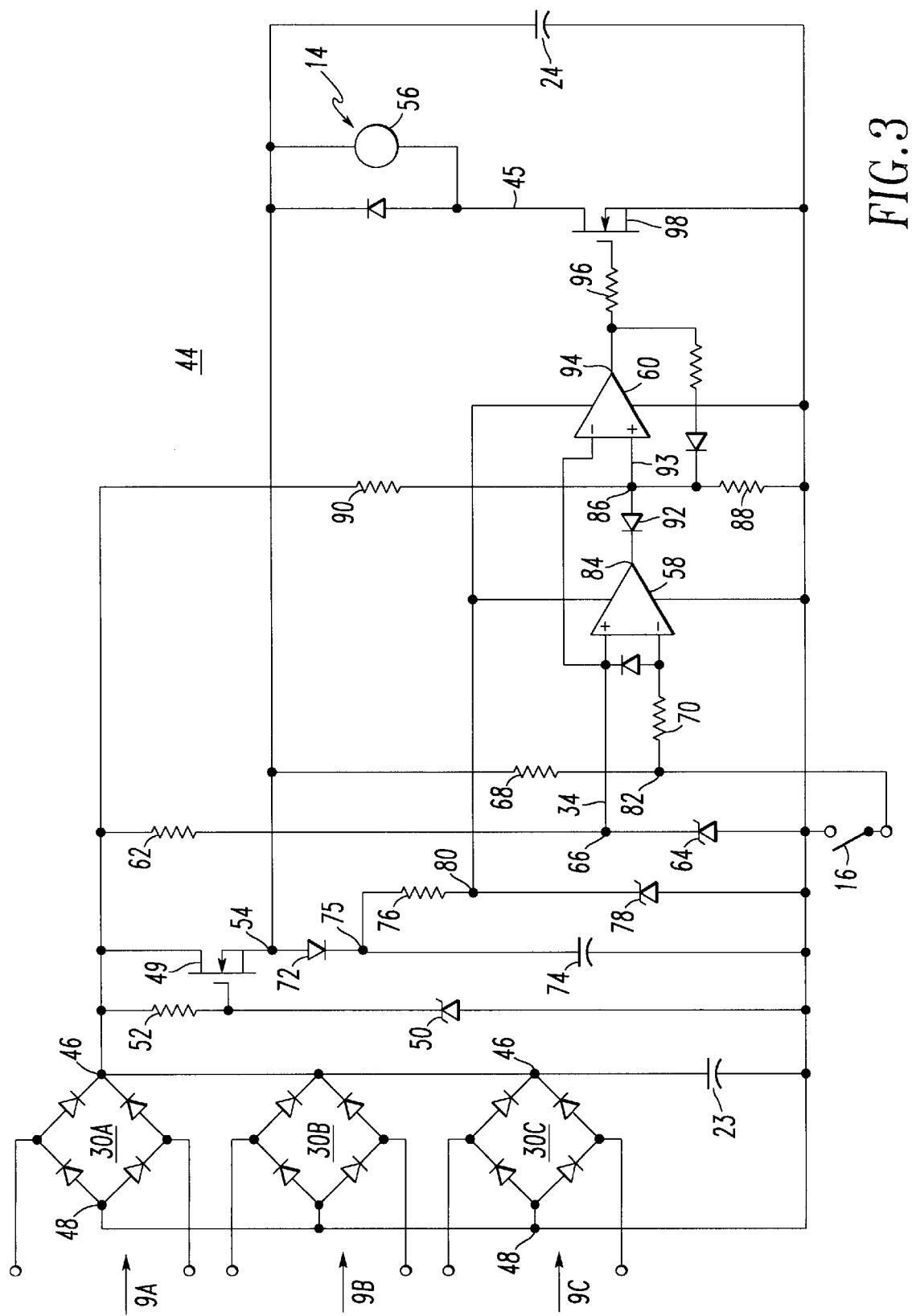
FIG. 3 is a schematic diagram further illustrating the trip unit and associated interfaces of FIG. 1.

Referring to FIG. 3, the analog trip circuit 44 is preferably employed to examine all three sensed current signals 9A,9B, 9C, select the highest signal, compare it to the reference voltage 34, and output a trip signal 45 of sufficient power level to the trip actuator 14. The AC signals 9A,9B,9C are applied to respective full-wave bridge rectifiers 30A,30B, 30C. The outputs 46,48 of the rectifiers 30A,30B,30C are tied in common across the capacitor 23.

The gate of field effect transistor (FET) 49 is biased by the voltage of zener diode 50 as established by current flowing through resistor 52. The transistor 49, configured as a source follower, provides a voltage at its source 54 and across capacitor 24. In the exemplary embodiment, the voltage at the source 54 is equal to the voltage of the zener diode 50 less about 4 V. That source voltage is then employed to power coil 56 of the trip actuator 14, to power two comparators 58,60, and to provide an input signal to the comparator 58, which is controlled by the MCR switch 16, for comparison with the reference voltage 34.

The reference voltage 34 is generated by the series combination of resistor 62 and zener diode 64 which combination is connected between the outputs 46,48 of the rectifiers 30A,30B,30C. The cathode of the zener diode 64 at connection point 66 provides the reference voltage 34 to the positive input of the comparator 58 and to the negative input of the comparator 60. The series combination of two resistors 68,70 is employed to connect the source 54 of the transistor 49 to the negative input of the comparator 58. The series combination of diode 72 and capacitor 74, which combination is connected between the source 54 of the transistor 49 and the output 48 of the rectifiers 30A,30B, 30C, is employed to charge the capacitor 74 at connection point 75. In turn, the series combination of resistor 76 and zener diode 78 is employed to develop a voltage at the cathode of the zener diode 78 at connection point 80 for powering the comparators 58,60.

The MCR switch 16 is connected between the output 48 of the rectifiers 30A,30B,30C, and the connection point 82 of the series resistors 68,70. Hence, before the predetermined time after the separable contacts 4 of FIG. 1 are closed, the connection point 82 is connected to the output 48 of the rectifiers 30A,30B,30C, which is the common reference for the trip circuit 44. Thus, the negative input of the comparator 58 is at the common reference, while the positive input remains at the higher reference voltage 34, and, hence, the comparator output 84 is high and the positive input to the comparator 60 remains enabled.

On the other hand, a predetermined time after the separable contacts 4 of FIG. 1 are closed, the MCR switch 16 is open, and the negative input of the comparator 58 is at a voltage which is substantially determined by the zener voltage of the diode 50. That voltage is selected to exceed the zener voltage of diode 64 so that the comparator output 84 is low. In turn, the output 84, when low, disables the positive input to the comparator 60.

The positive input of the comparator 60 is connected to the connection point 86 of the series combination of resistors 88,90, which combination is connected between the outputs 46,48 of the rectifiers 30A,30B,30C. When the output 84 of the comparator 58 is high (i.e., the MCR switch 16 is closed), the diode 92 blocks that high voltage and permits the connection point 86 to follow the highest of the three sensed current signals 9A,9B,9C, as output by the corresponding one of the respective rectifiers 30A,30B,30C, and as divided by the resistors 88,90 to provide a signal 93, from the voltage of the capacitor 23. In this state, the comparator 60 may detect a suitably high level of the highest of the three sensed current signals 9A,9B,9C, and set the comparator output 94 high. In turn, that high voltage of output 94 is applied through resistor 96 to the gate of FET 98 to generate the trip signal 45. Although the exemplary trip circuit 44 employs fixed thresholds to provide a non-adjustable trip unit, the invention is also applicable to trip units which employ adjustable thresholds.

On the other hand, when the comparator output 84 is low (i.e., the MCR switch 16 is open a predetermined time after the separable contacts 4 are closed), the connection point 86 is one diode drop above the common reference, which is below the reference voltage 34. Hence, this disables the comparator 60 a predetermined time after the separable contacts 4 of FIG. 1 are closed, and, thus, disables the trip signal 45.

In this manner, the comparator 60 may: (1) detect a fault current condition which appears after the separable contacts 4 have been closed for less than the predetermined time of the MCR switch 16, and (2) ignore any current or fault current condition which appears after the separable contacts 4 have been closed for greater than that predetermined time.

Figure 4:
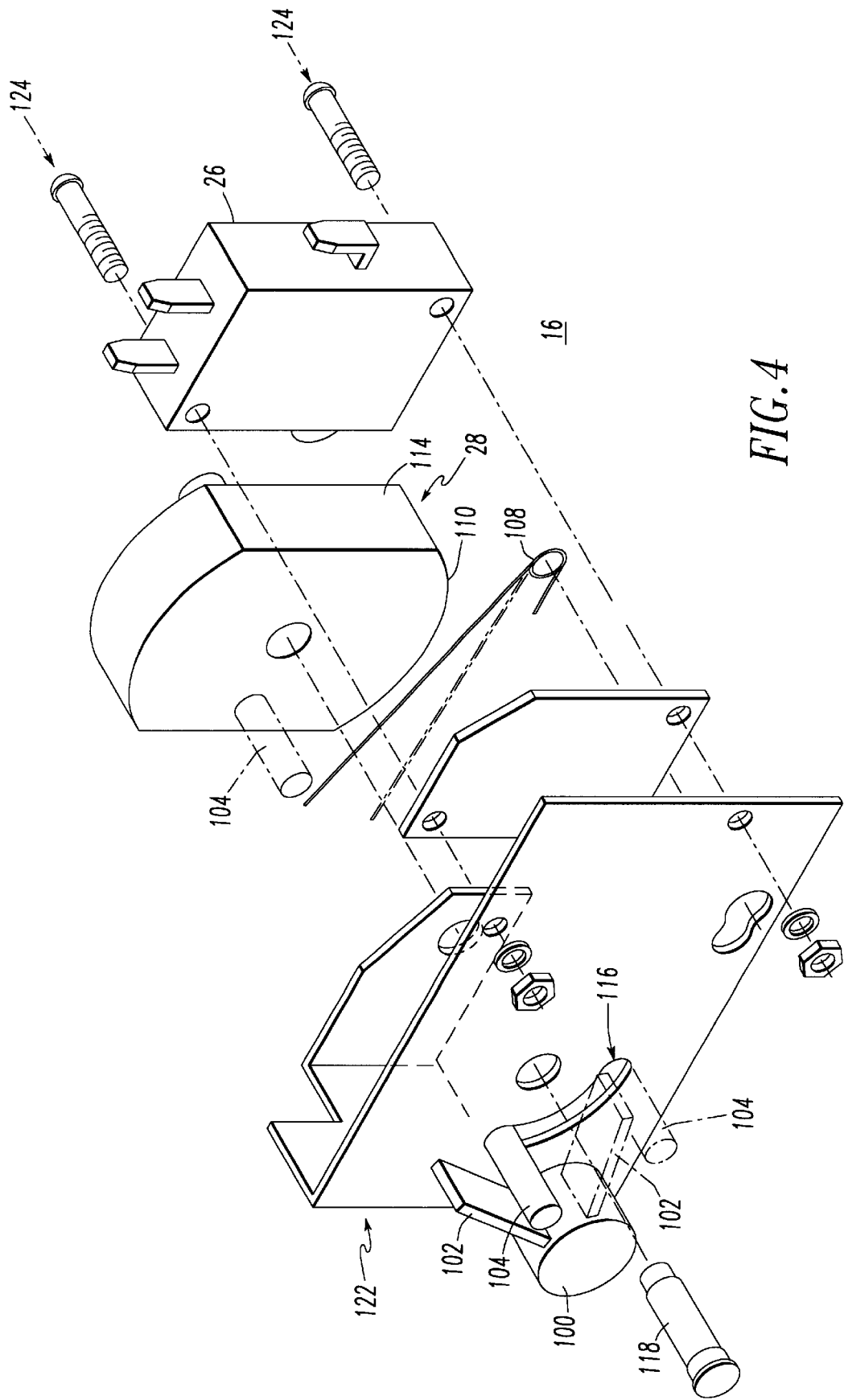
FIG. 4 is an exploded isometric view of the MCR switch of FIG. 1.

Referring to FIG. 4, the exemplary MCR switch 16 interfaces with a pole shaft 100 of the operating mechanism 6 of FIG. 1. As is well known in the art, the pole shaft 100 rotates as the operating mechanism 6 moves the separable contacts 4 from the open to the closed position. The pole shaft 100 has a member 102 disposed thereon which normally engages an extending pin 104 (as shown in phantom line drawing) of the MCR switch 16 in the open position of the separable contacts 4.

As viewed with respect to FIG. 4, when the pole shaft 100 rotates counter-clockwise toward its closed position which corresponds to the closed position of the separable contacts 4, the member 102 moves away from the pin 104. This allows the inertial wheel 28 of the MCR switch 16 to rotate under the influence of torsion spring 108 which biases or rotates the wheel 28 clockwise (with respect to FIG. 4). In turn, the surface 110 of the wheel 28 disengages from the micro-switch 26 as the wheel 28 rotates to the position in which the pin 104 is shown in solid in FIG. 4. In this position, a flat 114 of the wheel 28 is disengaged from an actuator (not shown) of the micro-switch 26 which opens as discussed above in connection with FIG. 3. In this manner, the MCR switch 16 operates a predetermined time after the separable contacts 4 move to the closed position. It will be appreciated that the time may be predetermined by appropriate selection of the inertia of the wheel 28, spring 108, and the location of the surfaces 110,114 with respect to the actuator of the micro-switch 26.

Later, when the pole shaft 100 rotates clockwise (with respect to FIG. 4), the member 102 moves toward and engages the pin 104 as the separable contacts 4 open. The off center pin 104 of the wheel 28 is moved to the position 116 and, thus, rotates the wheel 28 about central pivot pin 118. This holds the wheel 28 in the position at which the pin 104 (shown in phantom line drawing) is located at the position 116. As the wheel 28 is rotated sufficiently counter-clockwise, the surface 110 of the wheel 28 engages the actuator (not shown) of the micro-switch 26.

In the exemplary embodiment, the micro-switch 26 is preferably secured to a mounting bracket 122 by suitable fasteners 124. In turn, the bracket 122 is mounted within the circuit breaker 2 of FIG. 1 to permit engagement of the pin 104 by the member 102 of the pole shaft 100.

Although an exemplary mechanical mechanism 16 is disclosed for determining the signal 18 of FIG. 1 having a first state (contacts closed) for the open position of the separable contacts 4, and a second state (contacts open) a predetermined time after the contacts 4 move to the closed position, other equivalent electrical, electro-mechanical and mechanical mechanisms may be employed (e.g., an auxiliary switch having an electrical or mechanical time delay).

Referring to FIGS. 5A and 5B, the current sensor 7B of the current sensing mechanism 7 of FIG. 1 is illustrated. The current sensor 7B has a suitably low permeability core 125 that is placed in close proximity to each of the phase conductors 8, such as phase conductor 8B of FIG. 5B. The current sensor 7B has very modest requirements for accuracy and measurement range, and need not produce a significant power output signal within the normal load operating range of the circuit breaker 2 of FIG. 1. Instead, a suitably useful linear signal is provided as very high current levels are reached. Therefore, a high permeability core with a distributed winding is not required. In fact, to preserve linearity at very high primary current levels, an air core sensor, such as coil 22, can actually be advantageously used when placed in proximity of the conductors 8 to sense electrical current flowing therein and through the separable contacts 4 of FIG. 1.

An inexpensive bobbin-wound coil 22 is preferably placed next to the rectangular conductor 8B and designed for the specific conductor geometry. The output of the coil 22 depends upon the magnetic field strength produced by the primary current, the air core 125 cross-sectional area, and the number of turns. All of these factors may be suitably controlled in a specific circuit breaker geometry. The output of the sensor 7B for a practical geometry may be in the range of a few volts to many tens of volts, with the further advantage that the output signal is linear and does not saturate.

Since the sensor 7B is basically sensing the intensity of the magnetic flux field at a given point in space, it can be sensitive to conductor geometry, as well as to any adjacent phase conductors or iron structures. For any given circuit breaker, the sensor 7B is preferably placed in the same position relative to the conductors so that the geometry effects will not affect unit-to-unit performance.

The sensors 7 produce a voltage which is proportional to the rate of change of the magnetic flux cut by the sensor coil 22 which, in turn, is proportional to the rate of change of the fault current in the phase conductors 8. For sinusoidal currents of known frequency, the raw output signal of each of the sensors 7 is directly proportional to the RMS value of the fault current. This technique produces a signal with a minimum time delay and which is relatively unaffected by the direct current (DC) offset current that is present in most three-phase faults.

The sensors 7 preferably include bobbin-wound coils 22, which are placed near the associated phase conductors 8 so as to experience a magnetic field which is directly proportional to the current flowing in the conductor 8. A low permeability core material (e.g., without limitation, air, powdered iron, powdered ferrous compounds, powdered steel, composite materials employing ferrous compounds, materials having a permeability of less than about 10 such that the output signal is linear and does not saturate) which fills the center 126 of the coil 22 may be used to increase the signal size, somewhat, so to reduce the core size or number of turns. If the axis of the coil 22 is placed parallel to a long side of the rectangular conductor 8B, as shown in FIG. 5A, it will experience a magnetic field intensity (i.e., B2) that is principally due to the current in that conductor 8B, and only secondarily due to currents in the neighboring phase conductors 8A and 8C (i.e., magnetic field intensities B1 and B3, respectively).

To estimate the useful voltage and power output of such a sensor, consider an exemplary air core coil cross-sectional area of 1.0 cm$^2$, sitting at an average effective radius of 5.0 cm, with 10,000 turns of number 38 copper wiring. Such a sensor next to a long, straight conductor would produce a voltage signal of about 60 VAC RMS at a fault current of 40 kA. With a sensor internal resistance of about 800 Ω, a maximum theoretical power level in excess of one watt can be delivered into a load of similar impedance. This power level is adequate to reliably release a permanent magnetic-latched spring-stored-energy trip actuator, such as the exemplary low energy trip actuator 14 of FIG. 1.

Alternatively, if greater power is needed by the trip actuator, then the bore of the sensor coil 22 can be filled with a cylindrical iron powered core, the length of which is equal to that of the coil bobbin. This will increase the "effective" permeability of the core by a factor of two to ten and, thus, increase the signal level or reduce the overall size and cost of the sensor at the same signal level.

The output of the sensors 7 is also dependent upon the path geometry of the conductors 8. The sensors 7 are preferably located near a 90° bend in the conductors 8, with a still further preferred location being inside the bend rather than outside, as shown in FIG. 5B. This increases the output signal level considerably due to the additional flux created by the 90° conductor segment. Theoretically, the flux level may double in this configuration, although actual experimental results show an increase by a factor of less than 50 percent. For any given current path geometry and location, the signal size can be calibrated, and should be repeatable from breaker to breaker.

A major source of error affecting the magnetic field sensor 7B is its cross sensitivity to fault currents flowing in the neighboring phases. By placing the sensor 7B adjacent to and midway along the long surface of the rectangular conductor 8B and adjacent to the 90° internal bend 128 as shown in FIG. 5B, the sensitivity to phase current can be maximized while minimizing the sensitivity to adjacent (neighboring) phase currents.

The accuracy of the sensors 7 depend upon several factors, including the number of turns, the coil cross-sectional area, the core permeability (if not air), and its location relative to the current path. If all of these factors are controlled, then a sensor-to-sensor repeatability of about +/−5% is attainable. The cross-sensitivity of the sensor 7 to the magnetic field of neighboring phase conductors can be minimized by its proper positioning. Flux plots of an idealized two-dimensional geometry indicate that a three-phase fault compared to a single phase fault might produce a difference in field strength at the sensor 7 of an additional three percent. Thus, the total inaccuracies of an interchangeable current sensor under all fault current conditions is estimated to be better than +/−10%. This is adequate for the exemplary sensor 7.

The invention provides the MCR trip function in a cost-effective manner for the exemplary non-automatic circuit breaker 2. The exemplary MCR trip unit 10 provides a useful addition to the non-automatic circuit breaker 2 which protects such breaker if it is closed into a fault current exceeding its "close and latch" capability. In this manner, the non-automatic circuit breaker 2 may be safely applied with available fault currents up to its full short time withstand current rating. Accordingly, this protection system addresses a significant weakness of conventional non-automatic circuit breakers with only a modest increase in cost.

Although the present invention has been described in terms of a switch providing a mechanical or inertial delay for outputting a signal after separable contacts move from the open to the closed position, it will be appreciated that an electrical or other suitable time delay may provide an equivalent delay function.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalence thereof.

What is claimed is:

1. A non-automatic power circuit breaker comprising:
    separable contact means for movement between a closed position and an open position, said separable contact means having an electrical current passing therethrough;
    operating means for moving said separable contact means between the closed position and the open position thereof;
    means for determining a signal having a first state for the open position of said separable contact means and a second state after said separable contact means moves to the closed position thereof;
    sensing means for sensing said electrical current of said separable contact means and providing a signal corresponding to said electrical current;
    tripping means employing said signal corresponding to said electrical current and said signal corresponding to the open and closed positions of said separable contact means for providing a trip signal, said tripping means including means for disabling the trip signal when said signal of said means for determining has the second state;
    trip actuator means employing the trip signal for actuating said operating means to move said separable contact means to the open position thereof,
    means for powering said trip actuator means form said signal of said sensing means;
    switch means driven by said means cooperation with said operating means for determining said signal having the first and second states;
    wherein said means for determining includes means cooperation with said operating means for determining said open and closed positions of said separable contact means;
    wherein said operating means includes a pole shaft which rotates as said operating means moves said separable contact means form the open position to the closed position thereof; and
    wherein said means cooperating with said operating means includes an inertial wheel having an off center pin and an engagement surface, and a spring biasing said inertial wheel in a rotational direction, with said pole shaft engaging said pin in the open positions of said separable contact means and holding said inertial wheel in a first rotational position, with said pole shaft disengaging from said pin when said pole shaft rotates to move said separable contact means form the open position to the closed position thereof, with said spring rotating said inertial wheel in the rotational direction to a second rotational position, and with said engagement surface of said inertial wheel engaging said switch means to output said signal having the second state a predetermined time after said separable contact means moves to the closed position thereof.

\* \* \* \* \*